United States Patent [19]
Jang

[11] Patent Number: 5,909,854
[45] Date of Patent: Jun. 8, 1999

[54] REEL TABLE DRIVING DEVICE FOR A VIDEO CASSETTE RECORDER

[75] Inventor: Ho-Jun Jang, Seoul, Rep. of Korea

[73] Assignee: Daewoo Electronics Co., Ltd., Seoul, Rep. of Korea

[21] Appl. No.: 08/360,866

[22] Filed: Dec. 21, 1994

[30] Foreign Application Priority Data

Dec. 22, 1993 [KR] Rep. of Korea ....................... 93-29144

[51] Int. Cl.⁶ ............................ G11B 15/32; G11B 5/008
[52] U.S. Cl. ............................................. 242/356; 360/96.3
[58] Field of Search ................................ 242/356, 356.3; 360/96.3

[56] References Cited

U.S. PATENT DOCUMENTS

| | | | |
|---|---|---|---|
| 4,018,518 | 4/1977 | Wright | 242/356 X |
| 4,436,257 | 3/1984 | Osanai | 242/356 X |
| 4,482,226 | 11/1984 | Tamamura | 242/356 X |

FOREIGN PATENT DOCUMENTS 58-150158  9/1983  Japan ....................... 242/356

*Primary Examiner*—John Q. Nguyen
*Attorney, Agent, or Firm*—Anderson, Kill & Olick, P.C.

[57] ABSTRACT

A reel table driving device for use in a video cassette recorder comprises a pair of idlers disposed adjacent to a supply reel table and a take-up reel table in order to minimize the travelling distance thereof as a support plate for rotatably holding the idlers is rotated by the conversion of the operating mode, said idlers being constructed of a stepwise relationship with each other so that each reel table generates a sufficient torque during the switching of the operation mode, thereby preventing slackness of a loaded magnetic tape.

1 Claim, 4 Drawing Sheets

REEL TABLE DRIVING DEVICE FOR A VIDEO CASSETTE RECORDER

FIELD OF THE INVENTION

The present invention relates to a reel table driving mechanism and, more particularly, to a device for driving reel tables of a video cassette recorder ("VCR"), capable of preventing slackness of a magnetic tape loaded in the VCR during a change in its operating mode, while providing a variable torque to one of the reel tables through an idler thereof for a selected mode.

DESCRIPTION OF THE PRIOR ART

As is well known, a VCR is operable in various modes, e.g., play mode, review mode, rewinding mode, fast forward mode, through the selective operation of the driving mechanism thereof. Usually, the switching of the operating mode is executed by the selective drive of a supply reel table and a take-up reel table of the VCR. Typically, such a driving mechanism includes an idler positioned between the supply reel table and the take-up reel table, which is shifted clockwise and counterclockwise to transmit selectively its driving force to one of the reel tables, thereby enabling the VCR to operate in a certain selected mode. However, looseness of a loaded magnetic tape in the VCR may occur during the conversion to a desired mode of operation due to a delay in the shifting motion of the idler and the inertia moment of the reel tables, which may cause operational failures, noises and/or distortions.

A prior art reel table driving apparatus of a VCR is schematically shown in FIGS. 1 and 2. The VCR shown therein includes a supply reel table 10 and a take-up reel table 12 rotatably mounted to a deck (not shown). Further, the VCR is provided with a reel table driving mechanism 14 disposed between the supply reel table 10 and the take-up reel table 12, which drives selectively one of the reel tables 10,12 during the operation of the VCR in a selected mode. Typically, the reel table driving mechanism 14 includes a pulley 16 fixed to a shaft 18, a driving gear 20 secured to the shaft 18, a bracket 22 for rotatably supporting the shaft 18, means for driving the pulley 16, an idle gear 24 rotatably supported at the bracket 22 and meshed with the driving gear 20, and a gear train G disposed between the supply reel table 10 and the driving gear 20 to transmit the driving force of the driving gear 20 to the supply reel table 10 therethrough. The driving means has a driving pulley 26 fixed to a capstan shaft 28, and a belt 30 for interlinking the pulleys 16,26. As shown in FIGS. 1 and 2, the gear train G consists of a plurality of transerring gears which are designed to allow the supply reel table 10 to rotate in a relatively high speed therethrough.

According to the typical driving mechanism, e.g., in case of the rewinding mode operation, the counterclockwise rotation of the pulley 16 causes the idle gear 24 to be shifted toward and engaged with the gear train G, rotating the supply reel table 10. Likewise, in order to operate the VCR in the play mode, the pulley 16 is rotated clockwise. At this time, the idle gear 24 is shifted toward and directly engaged with the take-up reel table 12, thereby transmitting the rotating force of the driving gear 20 to the take-up reel table 12.

However, in the prior art reel table driving mechanism as discussed above, there may occur a tape slackness during the shifting of the idle gear 24 toward one of the reel tables 10,12 as the shifting motion of the idle gear 24 may be delayed due to its extended travelling distance. Further, the combination of the gear train with the driving mechanism entails a more complicated structure of the VCR.

SUMMARY OF THE INVENTION

Accordingly, it is an object of the present invention to provide a reel table driving device for use in a VCR, which is capable of preventing a loaded magnetic tape from slackening during the shifting of an operating mode by way of minimizing the travelling distance of an idle gear thereof.

It is another object of the present invention to provide a reel table driving mechanism with a pair of idlers which are designed to impart a variable torque to one of the reel tables in the VCR, while simplifying the structure thereof.

The above and other objects of the present invention are accomplished by providing a reel table driving device for use in a VCR having a supply reel table and a take-up reel table, which comprises:

a pulley attached to a lower end portion of a shaft rotatably held in a deck;

a driving gear mounted to the shaft;

a support plate coupled to an upper portion of the shaft; and a pair of idlers disposed adjacent to the supply reel and the take-up reel tables, and rotatably held in said support plate by pins, each of the idlers including a first gear meshed with said driving gear and a second gear selectively engaged with and disengaged from the supply reel and the take-up reel tables, said idlers being arranged in a spaced relationship with each other.

In accordance with a preferred embodiment of the present invention, the first and second gears of the respective idlers are constructed of a stepwise relationship with each other. The second gear of the first idler has more teeth than the first gear of the first idler and the second gear of the second idler has fewer teeth than those of the first gear of the second idler thereby providing a variable torque to one of the reel tables in accordance with a selected mode.

DESCRIPTION OF THE DRAWINGS

The above and other objects, features, and advantages of the present invention will become apparent from the following detailed description given in conjunction with the accompanying drawings, in which.

DETAILED DESCRIPTION OF THE PREFERRED EMBODIMENTS

Figure 1:
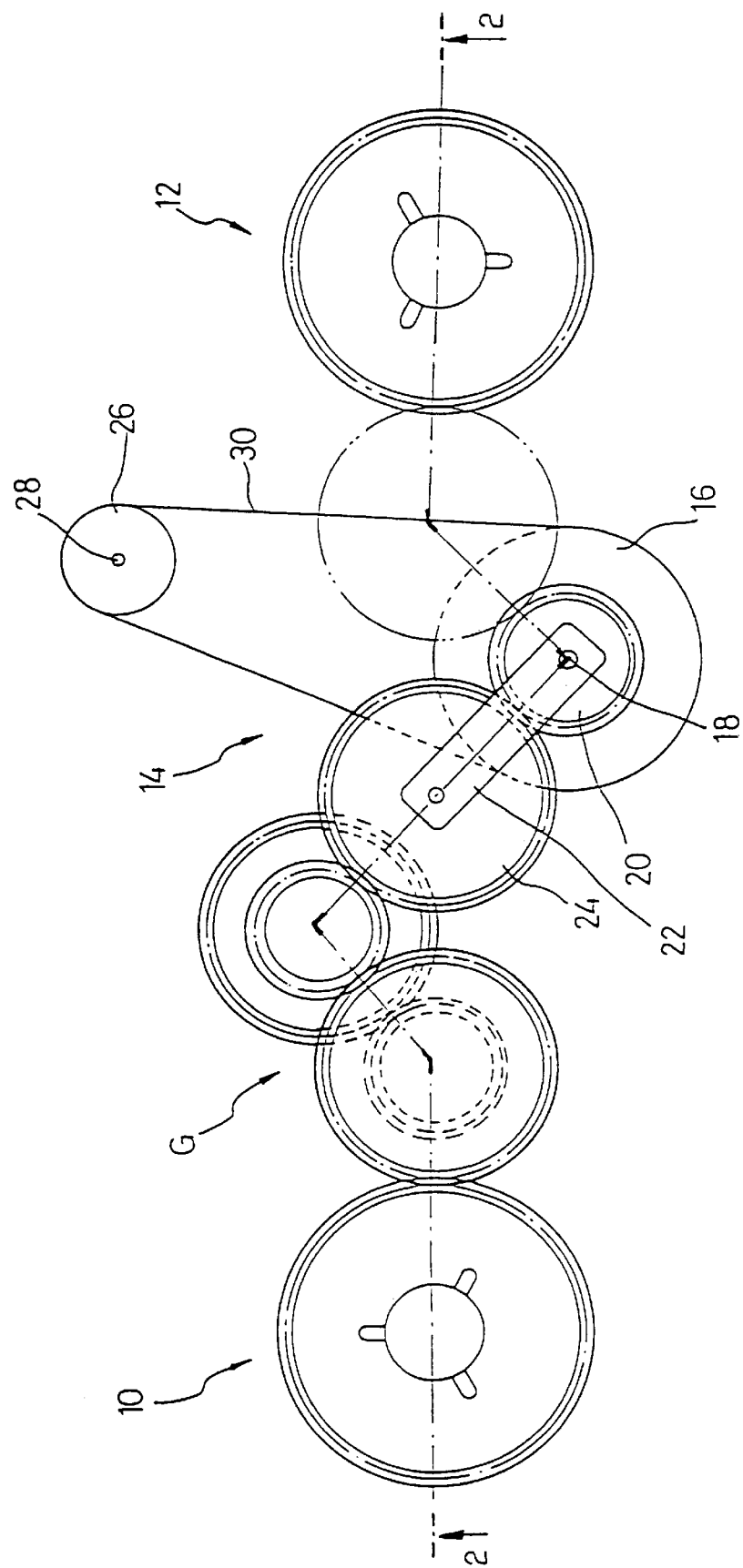
FIG. 1 is a schematic plan view of a prior art reel table driving device employed in a VCR.
Figure 2:
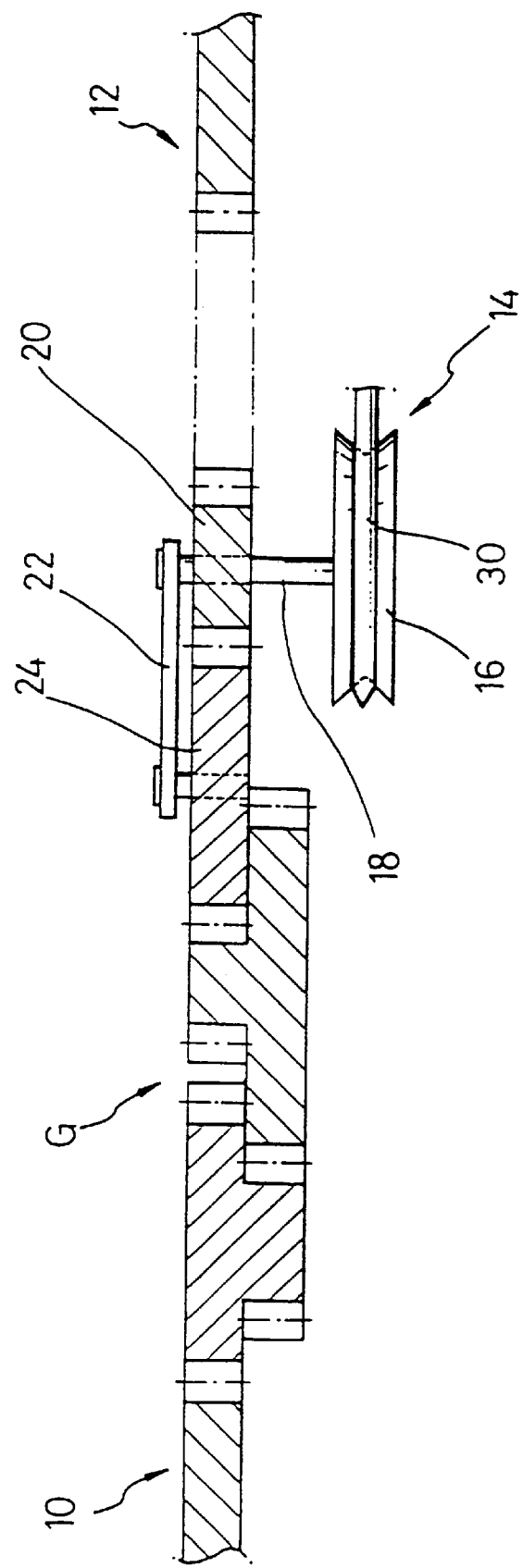
FIG. 2 is a sectional view of the device along line 2—2 shown in FIG. 1.
Figure 3:
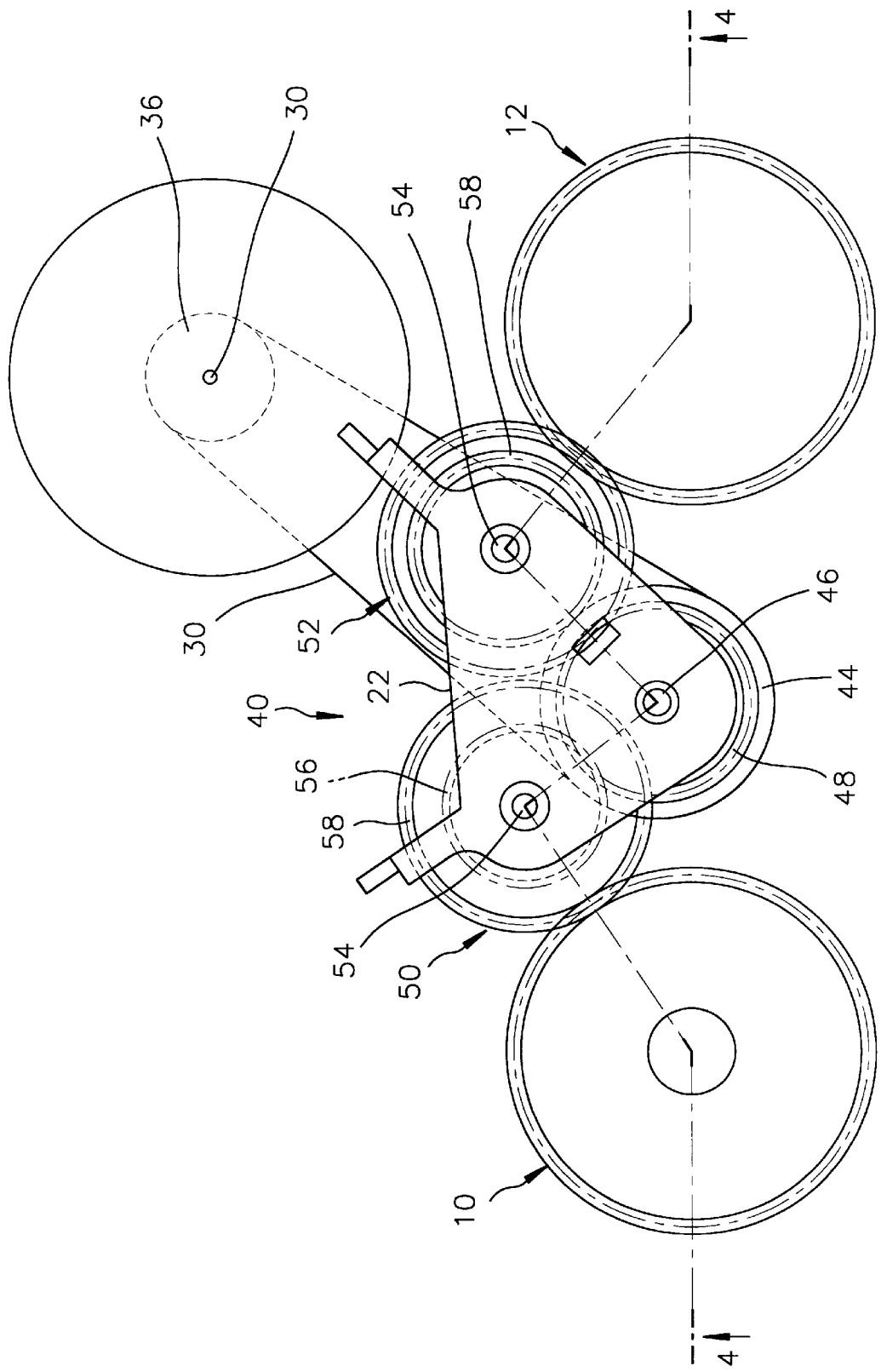
FIG. 3 is a schematic plan view of a reel table driving device in accordance with a preferred embodiment of the present invention.
Figure 4:
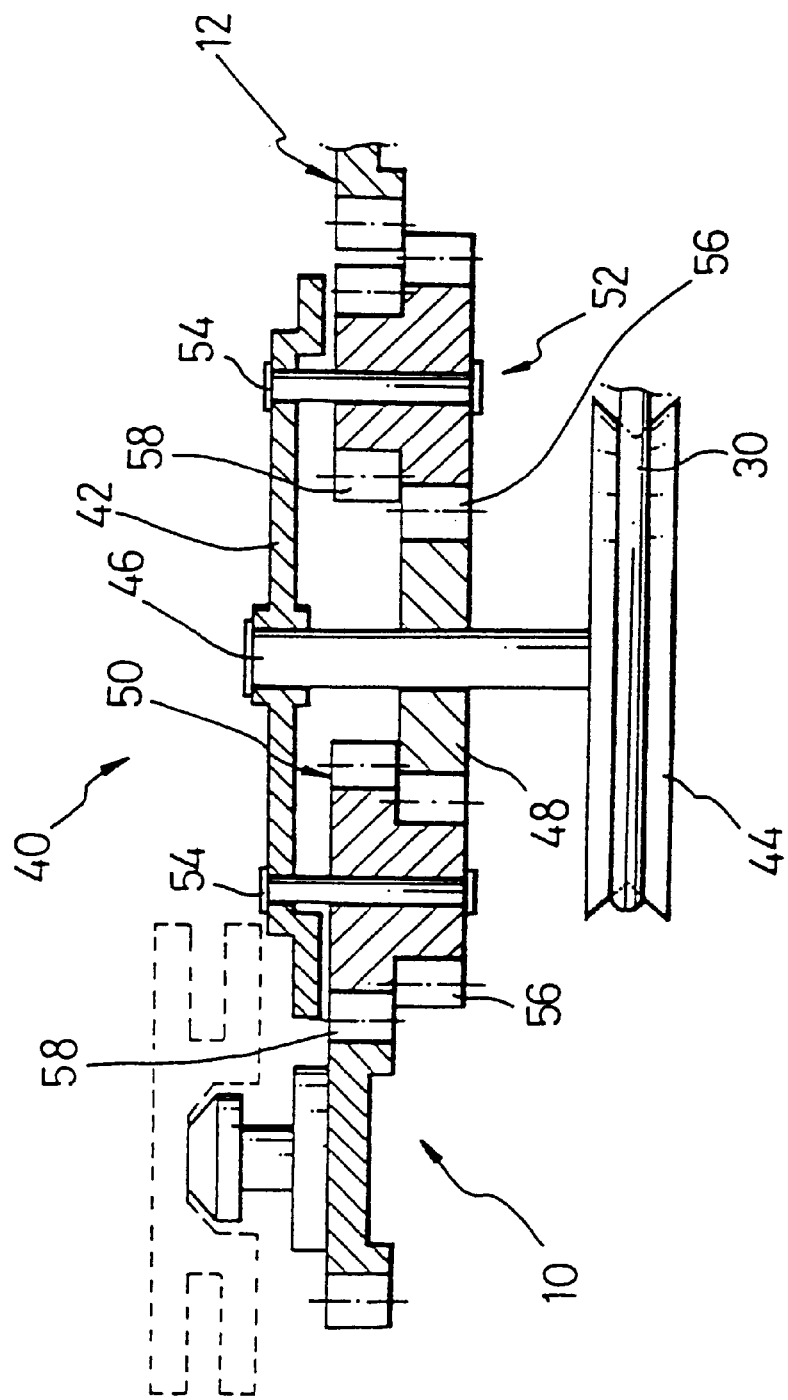
FIG. 4 is a sectional view of the device along line 4—4 shown in FIG. 3.

Referring now to FIGS. 3 and 4, there is shown a reel table driving device for use in a VCR in accordance with a preferred embodiment of the present invention. The reel table driving device 40 comprises a support plate 42, a pulley 44 attached to a shaft 46 rotatably held in the support plate 42 and a deck, a driving gear 48 mounted to the shaft 46, and a pair of idlers 50,52 engaged with the driving gear 48 and rotatably at the support plate 42 by pins 54. The idlers 50,52 are disposed between a supply reel table 10 and a takeup reel table 12 rotatably mounted to a deck of the VCR(not shown). Further, the idlers 50,52 are arranged in a properly spaced relationship with each other so that one of them is selectively engaged with and disengaged from one of the supply reel and take-up reel tables 10,12. In particular, the idlers 50,52 are positioned adjacent to the reel tables 10,12 so as to minimize their shifting motion therebetween. This can prevent a loaded tape (not shown) from slackening during the switching of the operation mode.

As best shown in FIG. 4, each of the idlers 50,52 is provided with a set of stepped gears integrally formed therein. That is, the first and second idlers 50,52 include first gears 56 meshed with the driving gear 48, and second gears 58 to be selectively engaged with and disengaged from the supply reel and the take-up reel tables 10,12. Further, the second gear 58 of the first idler 50 has more teeth than its first gear 56 to thereby rotate the supply reel table 10 in a relatively high speed, and the second gear 58 of the second idler 52 has fewer teeth than the first gear 56 of the second idler to thereby rotate the take-up reel table 12 in a relatively low speed.

In accordance with a preferred embodiment of the present invention, the operation of the reel table driving device as constructed above will now be described hereinbelow. First, in case of the play mode operation of the VCR, with the clockwise rotation of the driving gear 48, the support plate 42 of the reel table driving device 40 is quickly shifted toward the take-up reel table 12 due to the rotating force of the driving gear 48. As a result, the second gear 58 of the second idler 52 is engaged with the take-up reel table 12 so that the rotation of the driving gear 48 is transmitted to the take-up reel table 12 through the second idler 52. At that time, since the gear ratio of the second gear 58 to the first gear 56 of the second idler 52 is small, the take-up reel table 12 can be smoothly rotated at a proper torque, thereby operating the VCR in the play mode.

On the other hand, in the rewinding mode operation of the VCR, the driving gear 48 is rotated in the counterclockwise direction, causing the support plate 42 to be shifted toward the supply reel table 10. Therefore, the second gear 58 of the first idler 50 is instantaneously engaged with the supply reel table 10 upon the disengagement of the second idler 52 from the take-up reel table 12. At that time, the supply reel table 10 is subjected to a relatively strong rotating force because the gear ratio of the second gear 58 to the first gear 56 of the first idler 52 is large. Therefore, the supply reel table 10 can be rotated in a relatively high speed, thereby achieving a desirable rewinding operation of the VCR.

As discussed above, in accordance with the reel table driving device of the present invention, the shifting distance of the idlers is minimized to thereby prevent the slackness of a loaded magnetic tape during the change of the operating mode. In addition, the inventive design of the idlers renders the structure of the reel table driving mechanism to be more simplified and compact, while imparting a stronger rotating force to the supply reel table during a rewinding operation of the VCR.

Although the present invention has been shown and described with reference to the particular embodiment, it will be apparent to those skilled in the art that many changes and modifications may be made without departing from the spirit and scope of the invention as defined in the following claims.

What is claimed is:

1. A reel table driving device for use in a video cassette recorder having a supply reel table and a take-up reel table, which comprises:

a pulley attached to a lower end portion of a shaft rotatably held in a deck;

a driving gear mounted to the shaft;

a support plate coupled to an upper portion of the shaft; and a pair of idlers disposed adjacent to the supply reel and the take-up reel tables, and rotatably held in said support plate by pins, each of the idlers including a first and a second stepped gears integrally formed therein, and the first and the second gears being arranged in an axially spaced relationship width each other, the first gear being meshed with said driving gear and the second gear selectively engaging with and disengaging from the supply reel and the take-up reel tables, said second gear of the first idler having more teeth than the first gear of the first idler to rotate the supply reel table at a relatively high speed, and said second gear of the second idler has fewer teeth than the first gear of the second idler to rotate the take-up reel table at a relatively low speed, thereby providing a variable torque to one of the reel tables depending on an operating mode of the video cassette recorder.

* * * * *